United States Patent
Patel

(10) Patent No.: US 12,521,129 B1
(45) Date of Patent: Jan. 13, 2026

(54) METHOD OF SOFT TISSUE PRESERVATION DURING KNEE REPLACEMENT SURGERY

(71) Applicant: Jiffy Knee, LLC, Suffolk, VA (US)

(72) Inventor: Manish A. Patel, Suffolk, VA (US)

(73) Assignee: JIFFY KNEE LLC, Suffolk, VA (US)

(*) Notice: Subject to any disclaimer, the term of this patent is extended or adjusted under 35 U.S.C. 154(b) by 0 days.

(21) Appl. No.: 18/828,451

(22) Filed: Sep. 9, 2024

Related U.S. Application Data

(60) Provisional application No. 63/586,072, filed on Sep. 28, 2023.

(51) Int. Cl.
*A61B 17/16* (2006.01)
*A61B 17/02* (2006.01)

(52) U.S. Cl.
CPC .. *A61B 17/1677* (2013.01); *A61B 2017/0268* (2013.01)

(58) Field of Classification Search
CPC ...... A61F 2/461; A61F 2/4618; A61B 17/158; A61B 17/1677; A61B 17/1767
See application file for complete search history.

(56) References Cited

U.S. PATENT DOCUMENTS

| | | | | |
|---|---|---|---|---|
| 5,941,884 | A * | 8/1999 | Corvelli | A61B 17/1767 606/88 |
| 11,553,910 | B1 * | 1/2023 | Sartawi | A61B 17/06166 |
| 11,759,322 | B1 * | 9/2023 | Ali | A61F 2/30756 623/14.12 |
| 2003/0028196 | A1 * | 2/2003 | Bonutti | A61G 13/0054 606/87 |
| 2003/0171757 | A1 * | 9/2003 | Coon | A61B 17/157 606/87 |
| 2004/0039395 | A1 * | 2/2004 | Coon | A61B 17/155 606/87 |
| 2007/0043265 | A1 * | 2/2007 | Rochetin | A61B 17/02 600/211 |
| 2007/0233142 | A1 * | 10/2007 | Oliver | A61B 17/8866 606/88 |
| 2007/0265708 | A1 * | 11/2007 | Brown | A61F 2/3877 623/20.2 |
| 2017/0290669 | A1 * | 10/2017 | Termanini | A61F 2/38 |
| 2020/0316345 | A1 * | 10/2020 | Matthews | A61B 17/3401 |
| 2022/0023068 | A1 * | 1/2022 | Filipov | A61B 17/1664 |
| 2025/0195083 | A1 * | 6/2025 | Sioufi | A61B 17/1637 |

* cited by examiner

*Primary Examiner* — Matthew J Lawson
(74) *Attorney, Agent, or Firm* — Peter J. Van Bergen

(57) ABSTRACT

A surgical method that preserves soft tissue is provided. A medial oblique incision is performed in a patient's knee so that the knee's vastus medialis obliques (VMO) muscle and quadriceps tendon remain intact and uncut. The VMO muscle is then retracted to expose the knee's distal femur. The knee's distal femur may then be repaired as the in-tact VMO muscle is retracted.

13 Claims, 7 Drawing Sheets

METHOD OF SOFT TISSUE PRESERVATION DURING KNEE REPLACEMENT SURGERY

Pursuant to 35 U.S.C. § 119, the benefit of priority from provisional application 63/586,072, with a filing date of Sep. 28, 2023, is claimed for this non-provisional application, which is hereby incorporated by reference in its entirety.

FIELD OF THE DISCLOSURE

This disclosure relates generally to surgical procedures for a partial or complete total knee replacement, and more particularly to methods and systems that preserve soft tissues and minimize trauma to the vastus medialis obliques (VMO) muscle and the quadriceps tendon during knee replacement surgery.

BACKGROUND

During traditional knee replacement surgeries, a patient's vastus medialis obliques (VMO) muscle and quadriceps tendon are cut to facilitate the required access to the patient's patella and knee joint structure for the installation of artificial joint components. Unfortunately, this approach requires subsequent suturing of the VMO muscle and quadriceps tendon that may be a source of patient pain and/or complications during post-surgery rehabilitation.

SUMMARY

Accordingly, it is an object of the present disclosure to describe methods and systems for preserving soft tissue during knee replacement surgery.

Other objects and advantages of the methods and systems described herein will become more obvious hereinafter in the specification and drawings.

In accordance with methods and systems described herein, a surgical method includes performing a medial oblique incision in a patient's knee so that the knee's vastus medialis obliques (VMO) muscle and quadriceps tendon remain intact and uncut. The VMO muscle is then retracted to expose the knee's distal femur. The knee's distal femur may then be repaired as the in-tact VMO muscle is retracted.

BRIEF DESCRIPTION OF THE DRAWINGS

Other objects, features and advantages of the methods and systems described in the present disclosure will become apparent upon reference to the following description of the preferred embodiments and to the drawings, wherein corresponding reference characters indicate corresponding parts throughout the several views of the drawings and wherein.

DETAILED DESCRIPTION

The present disclosure describes a novel approach to knee replacement surgery that is suitable for use in a partial or a total knee replacement. As will be explained further below, the surgical procedure preserves or maintains important soft tissues related to joint mobility to eliminate the need to repair (e.g., suture) the soft tissues as part of a knee replacement surgery. Briefly and in accordance with the present disclosure, the knee replacement surgery eliminates the cutting of a patient's vastus medialis obliques (VMO) muscle and quadriceps tendon thereby reducing patient trauma, potential complications, and post-surgical pain to hasten the patient's recovery. The method will be described with reference to FIGS. 1-7 that illustrate a number of the sequential steps of the novel method. It is to be understood that the present disclosure focuses on the novel steps of knee replacement surgery, while only briefly describing other portions of knee replacement surgery that may be practiced in accordance with well-accepted techniques.

Figure 1:
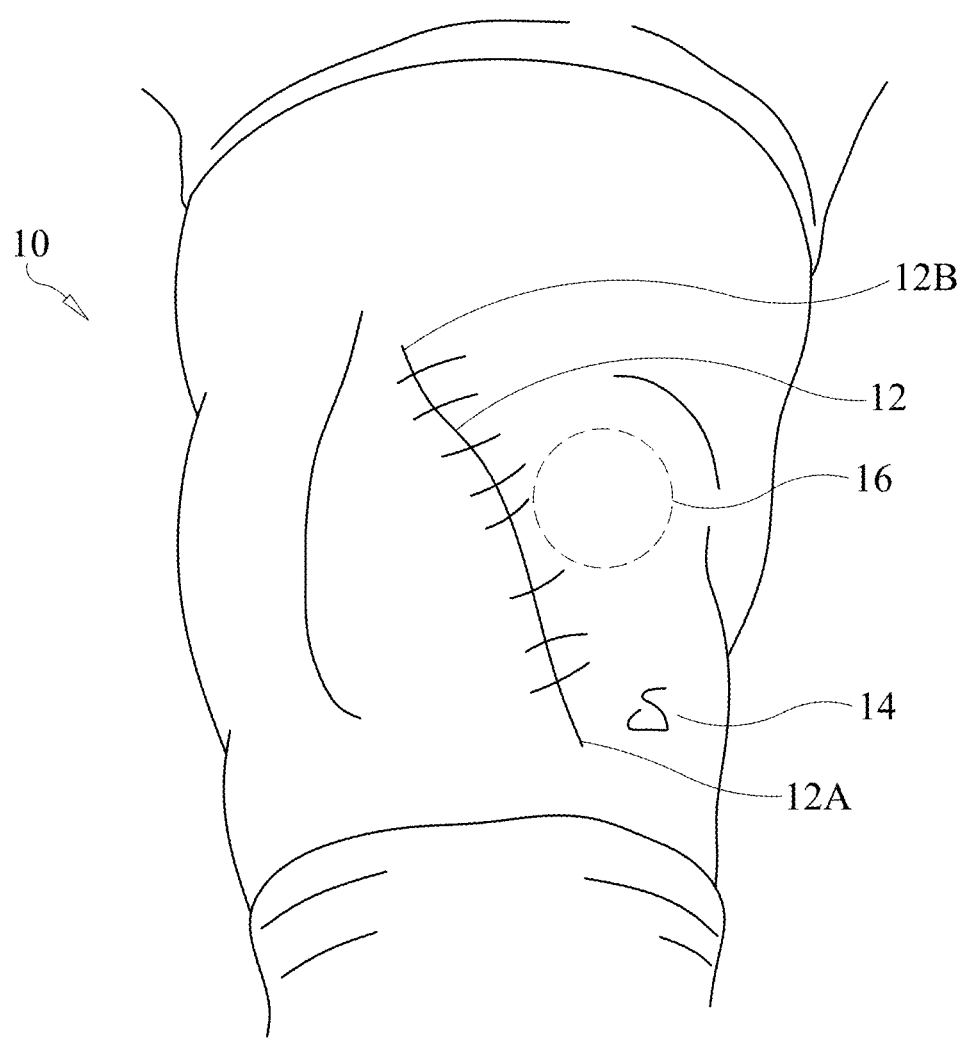
FIG. 1 illustrates a view of a patient knee with an incision line marking in accordance with various aspects as described herein.

Referring first to FIG. 1, a patient's knee (e.g., left knee) 10 is shown just prior to the start of a knee replacement surgery. In accordance with the present disclosure, the patient's skin over the patient's knee has a distal incision marking 12 drawn thereon to define a medial oblique line or path having one end 12A that is approximately one centimeter medial to the patient's tibial tubercle (indicated by marking 14). The incision marking 12 extends proximally in the antero-medial fashion obliquely and ends, for example, at the mid-level point 12B between anterior and posterior aspect of the medial thigh and just proximal to the superior pole of the patient's patella that is indicated by dashed line 16. The incision marking 12 operates as a guide for a subsequent medial oblique incision operation. Performance of a medial oblique incision along marking 12 may be originated at either end 12A or 12B. The medial oblique incision performed along marking 12 decreases the chance that the patient's VMO muscle will be cut, while also helping to prevent devitalization of the VMO muscle. In addition, the medial oblique incision performed along marking 12 prevents any inadvertent or intentional cutting of the patient's quadriceps tendon.

Figure 2:
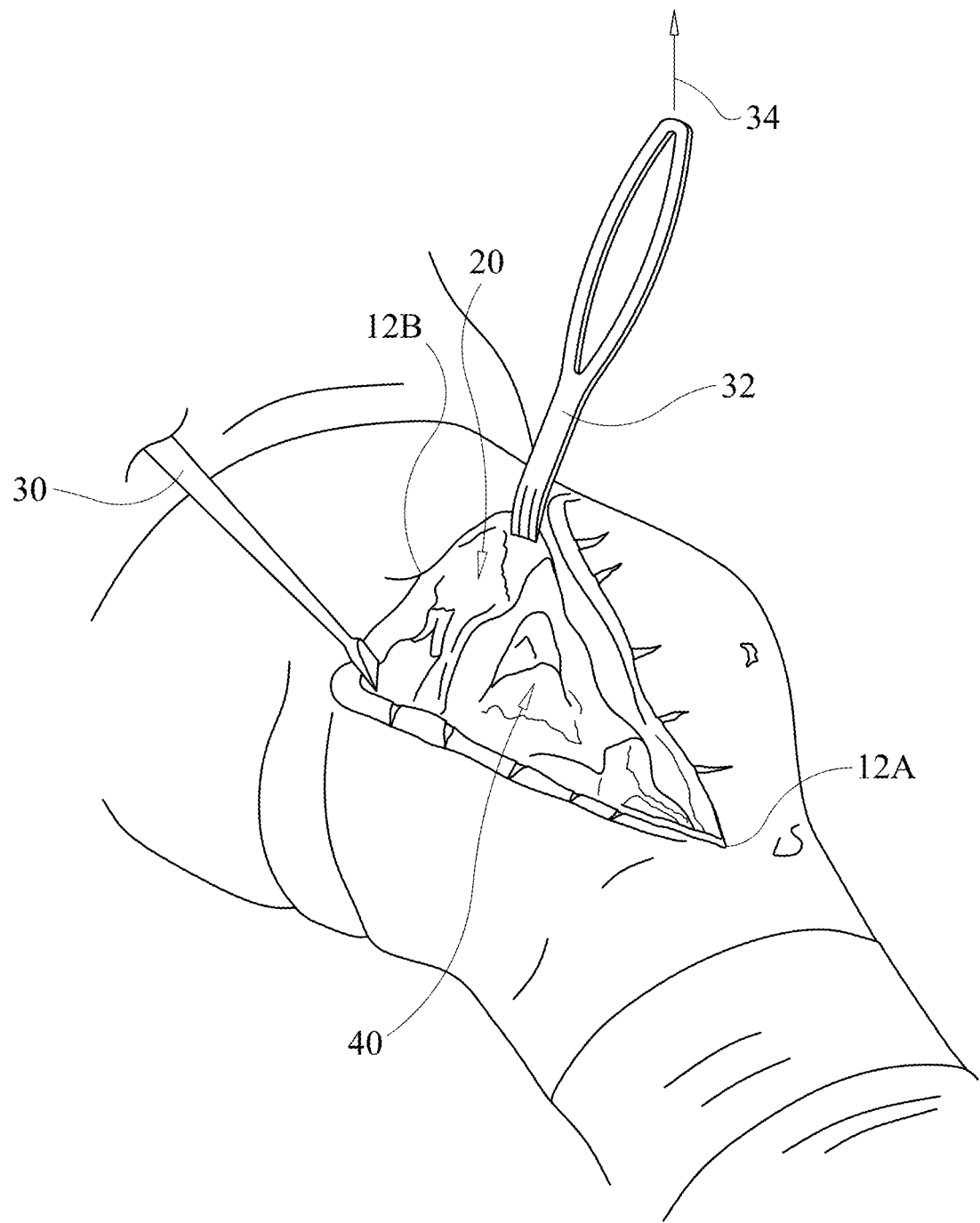
FIG. 2 illustrates a view of the patient's knee post-incision with the patient's vastus medialis obliques (VMO) muscle being retracted in accordance with various aspects as described herein.

Referring next to FIG. 2, after the skin is incised along the medial oblique incision marking 12 as shown in FIG. 1, sharp dissection is performed using, for example, a rake 30 positioned just to the junction between the patient's intact (i.e., uncut) VMO muscle 20 and the sartorius (not visible in FIG. 2). In some embodiments, a right-angle device 32 (e.g., an Army Navy as it is known) is used to lift the intact VMO muscle 20 as indicated by arrow 34 to expose the knee's capsule 40. Assuming the patient is in the supine position with their knee 10 facing up, lifting force 34 is directed upward from knee 10. In some embodiments, a practitioner's (e.g., surgeon, assistant, etc.) index finger (not shown) may be used to create the plane between the VMO muscle 20 and the sartorius. Once the intact VMO muscle 20 is lifted up using the device 32, a capsule arthrotomy may be performed from the distal to the proximal tibia as would be understood in the art.

Figure 3:
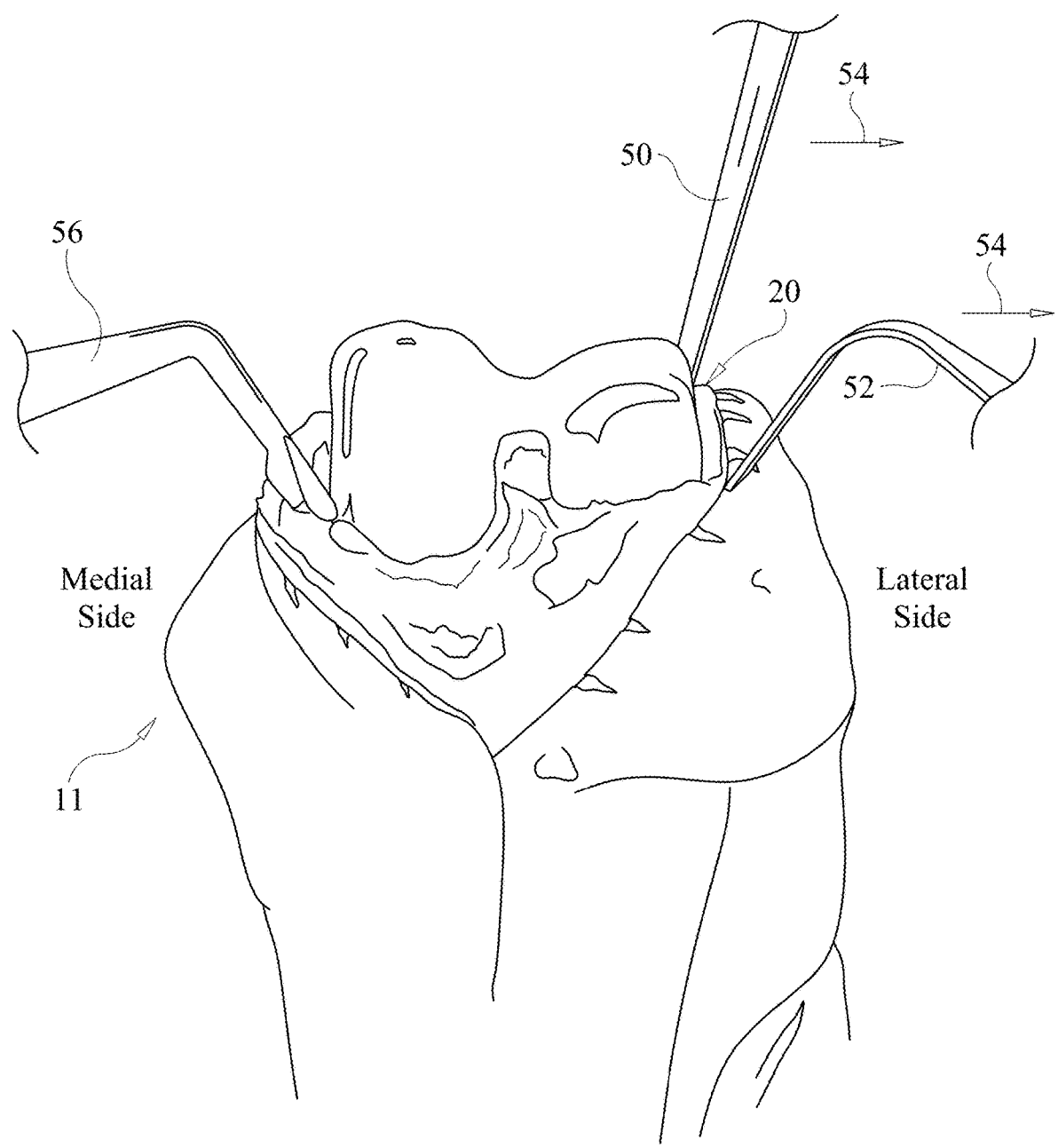
FIG. 3 illustrates an isolated view of the patient's distal femur undergoing medial and lateral side retraction with simultaneous VMO muscle retraction in accordance with various aspects as described herein.

Referring next to FIG. 3, an isolated view of the knee's distal femur is shown to more clearly illustrate the relevant steps of the knee repair/replacement surgical procedure. The distal femur is referenced generally by numeral 11 with the medial and lateral sides thereof being indicated. A straight retractor 50 (e.g., a Homan or similar retractor) is placed at the metaphyseal region of the lateral-side distal femur and is used to maintain retraction of the intact VMU muscle 20. A right-angled retractor 52 is placed on the lateral side of the tibial plateau in the metaphyseal region where it abuts the patella. Retractors 50 and 52 are then pulled laterally (as indicated by force arrows 54) and the knee is hyper flexed to help expose the distal femur and the proximal tibia (not visible), while preventing the intact VMO muscle 20 from pushing on the retractor 50 and to allow for exposure on the lateral side. Subsequently, a second right-angle retractor 56 is placed on the medial side.

Figure 4:
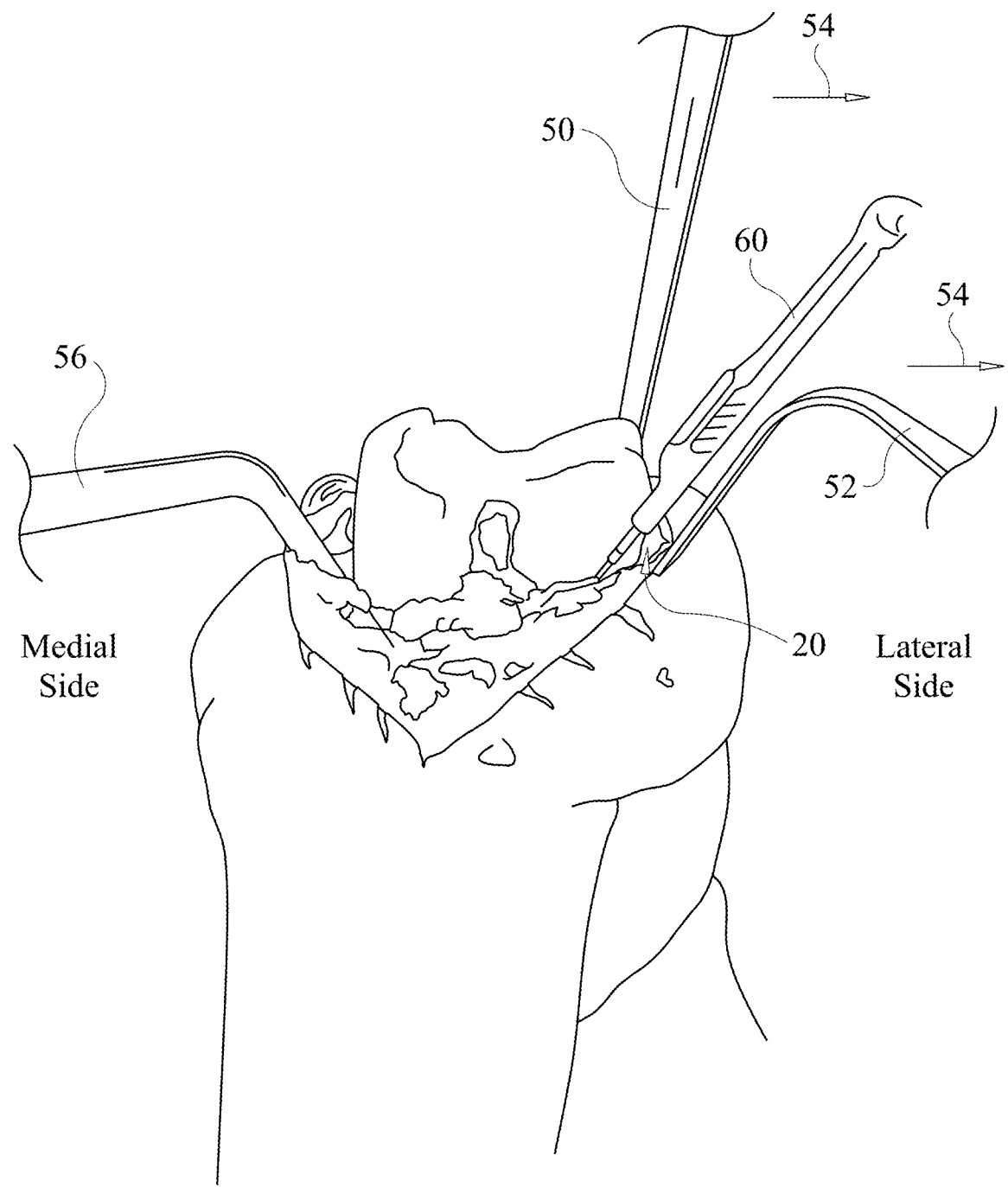
FIG. 4 illustrates an isolated view of the patient's distal femur undergoing medial and lateral side retraction with simultaneous VMO muscle retraction during anterior horn lateral meniscus removal in accordance with various aspects as described herein.

Referring next to FIG. 4, the anterior horn of the lateral meniscus is released to allow for a little bit less tension on the lateral side as is known in the art of knee replacement. As is also known in the art, a small portion of the anterior horn lateral meniscus may be removed by an instrument 60 as the patient's ACL is released. In accordance with the present disclosure, retraction of the intact VMO muscle 20 is maintained by continued lateral forces 54 applied to retractors 50 and 52.

Figure 5:
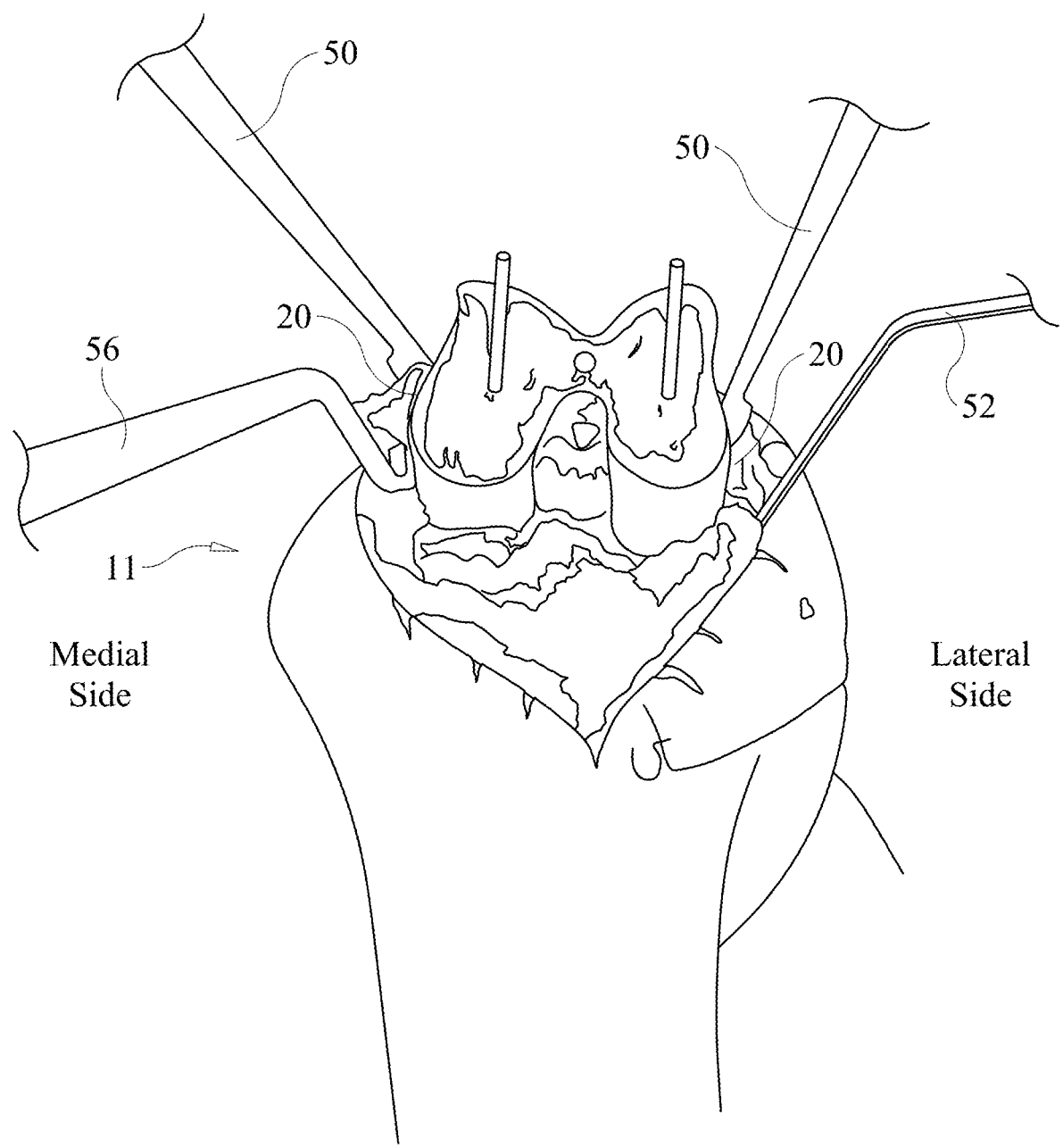
FIG. 5 illustrates an isolated view of the patient's distal femur undergoing medial and lateral side retraction with simultaneous VMO muscle retraction during distal femur preparation in accordance with various aspects as described herein.

After the femur and tibia are exposed as described above, the distal femur 11 is prepared to receive replacement components (not shown) in accordance with standard knee repair/replacement procedures once the arthrotomy is sufficient. Extensile approach may be performed both distantly and proximately as needed. In accordance with the present disclosure and as shown in FIG. 5, to prep for the distal femur cut, straight retractors 50 may be placed on both the medial and lateral side of the femur distally and posterior in order to maintain retraction of the intact VMO muscle 20 at two locations.

Figure 6:
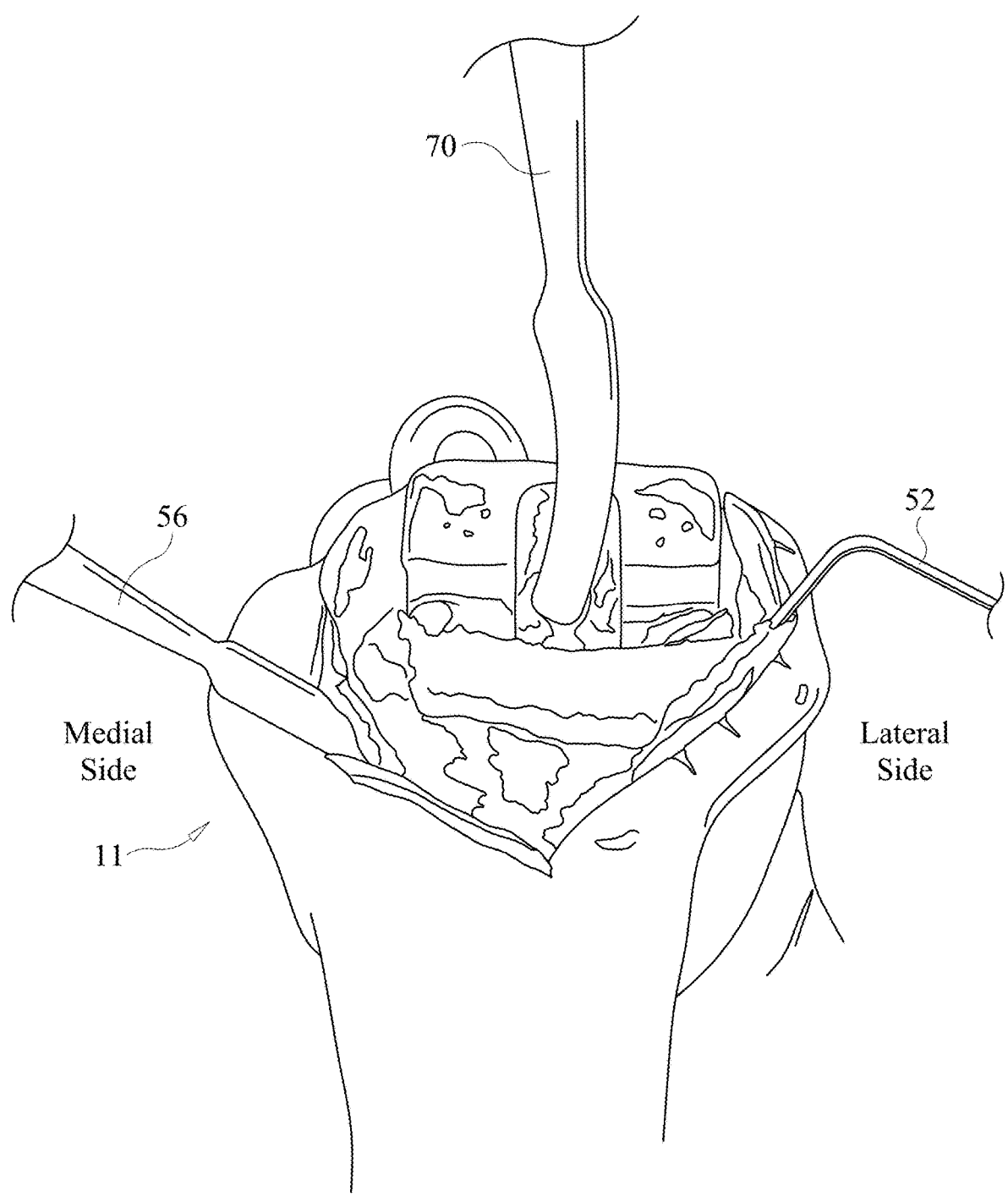
FIG. 6 illustrates an isolated view of the patient's distal femur undergoing medial and lateral side retraction during proximal tibia preparation in accordance with various aspects as described herein.

Once the distal femur is prepped with either a cruciate retaining or cruciate sacrificing method in accordance with standard practice, a protective retractor 70 may be placed on the poster aspect of the tibia for the proximal tibia cut as illustrated in FIG. 6. During this process, the above-described VMO muscle retractors 50 are removed from the regions of the distal femur 11. Then, the medial retractor 56 and lateral retractor 52 are re-positioned as shown to allow for greater exposure of the medial and lateral tibial plateaus. The knee is kept in hyper-flexion during this process and the proximal tibial preparation may be performed in accordance with standard practice. Briefly and as is well understood, posterior osteophytes/meniscal remnants are removed. Trial components may then be placed, fitted, and balanced in accordance with standard procedures. The knee may then be placed into extension for exposure of the patella.

Figure 7:
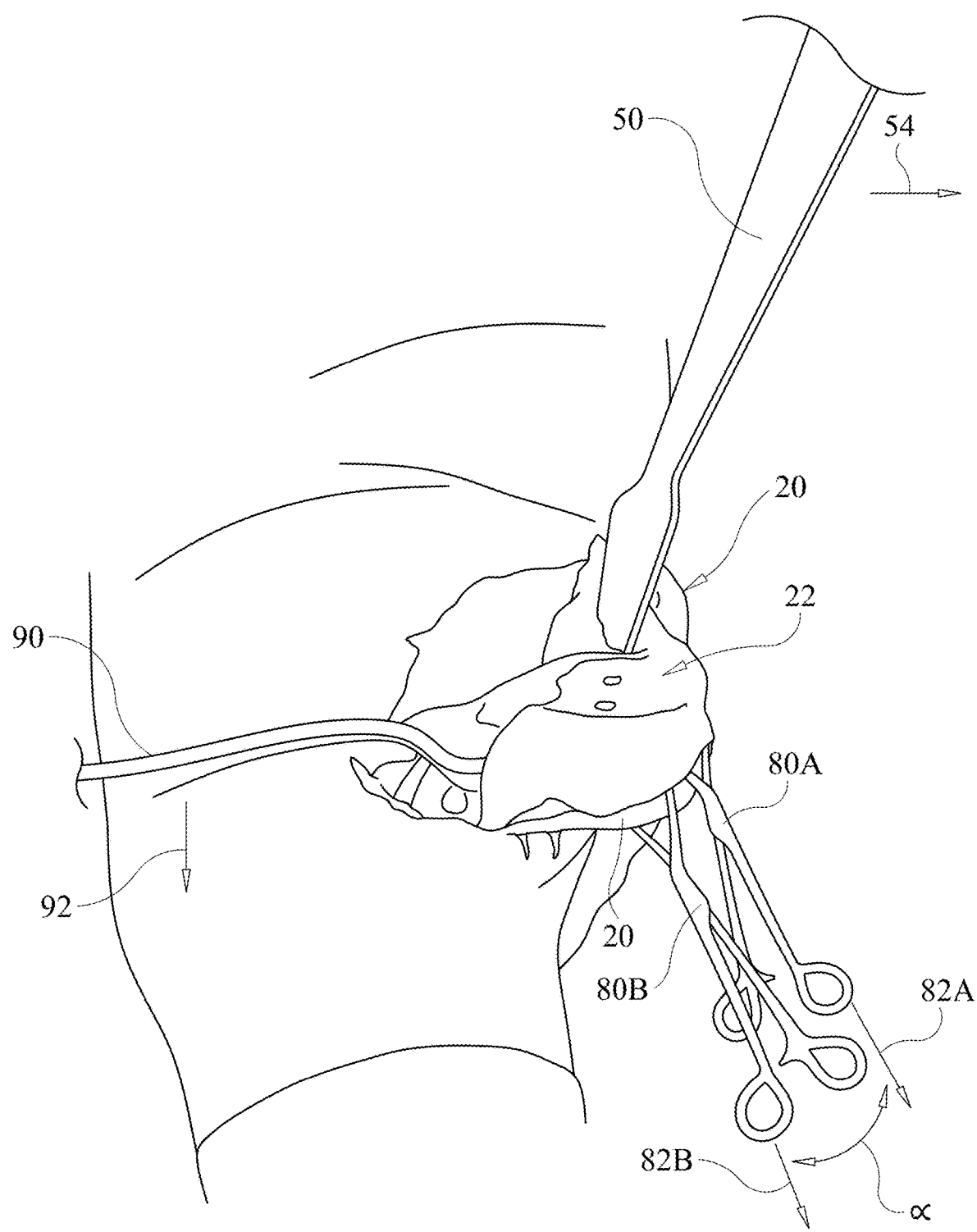
FIG. 7 illustrates an isolated view of the patient's distal femur undergoing patella eversion in accordance with various aspects as described herein.

In accordance with the present disclosure, patella exposure or eversion is accomplished in a unique fashion and is aided by the intact VMO muscle as will be explained further below. In some embodiments, two clips 80A and 80B (e.g., towel clips) may be positioned as illustrated in FIG. 7 where one clip 80A is placed on the inferior pole of the patella piercing the patellar tendon and the other clip 80B is placed on the medial aspect of the intact VMO muscle 20. A practitioner's thumb (not shown) may then be used to evert the patella 22 as diverging forces (indicated by arrows 82A and 82B) are simultaneously applied to the two clips 80A and 80B, respectively. More specifically, forces 82A and 82B diverge from one another at an acute angle $\alpha$ that may generally be in the range of 30° to 45°. Based on typical positioning of a patient during knee surgery, forces 82A and 82B are directed generally downward towards the floor of the operating theater where the procedure is being performed. In some embodiments, a pickle fork (also known as a double prong retractor) 90 may be placed on the lateral edge of the patella 22 prior to its complete inversion. A downward force 92 is applied to pickle fork 90 to raise the adjacent lateral edge of the patella 22 while the two clips 80A/80B are simultaneously being pulled down to create an everted patella 22 that is parallel to the floor (not shown) of an operating theater where the procedure is performed. A straight retractor 50 may be positioned and used to move the intact VMO muscle 20 from the superior edge of the patella 22 using continued application of lateral force 54. More specifically, in FIG. 7, the retractor 50 is placed at the junction between the intact VMO muscle 20 and the intact quadriceps tendon (not visible in FIG. 7). Next, a practitioner's selected or preferred method of patellar resection is performed, the trial components placed, and all the trial components are subsequently removed along with any retractors.

After all the trialing has been performed, standard press fit or cementing techniques may be performed and the preoperatively-placed tourniquet may be released if desired. To allow exposure again, a right angle retractor may be placed both medially and laterally while the knee is hyper-flexed, and the tibial component may be impacted in place. The straight retractor 50 illustrated in FIG. 7 may then be moved onto the distal femur on the lateral aspect so the femur can be exposed. The implant may be impacted in place, excessive cement may be removed, and the straight retractor 50 may be removed. In some embodiments, the straight retractor 50 may be placed on the posterior aspect of the tibia to assist in placement of the poly material(s). The knee may then be extended to full extension, and the above-described two-clip technique along with the pickle fork and the straight retractor are utilized again for eversion of the patella. Once the cement is hard, all the retractors are removed.

The concluding steps of the procedure are in accordance with one or more standard practices. Briefly, the knee is flexed in the optimal position after lavage is performed and hemostasis achieved. The capsule and the medial aspect of the arthrotomy are repaired from just inferior at the VMO patella junction down distally in a figure of eight fashion with suture material that is preferred. The skin is then enclosed in the fashion that is preferred by the surgeon.

The advantages of the present methods and systems are numerous. The described approach eliminates the cutting of soft tissue associated with joint mobility, while also providing a procedure to evert a knee's patella in the presence of uncut soft tissue. As a result, critical knee joint components may be exposed for knee replacement without the trauma to the knee's soft tissue that has been traditionally associated with knee replacement surgery. Furthermore, the method's skin incision in the medial oblique fashion results in less post-operative tension on the skin and the knee's extensor mechanism when the knee is flexed. The overall reduction in soft tissue trauma equates to less post-operative pain and, therefore, a quicker recovery.

Although the methods and systems presented herein have been described for specific embodiments thereof, there are numerous variations and modifications that will be readily apparent to those skilled in the art in light of the above teachings. It is therefore to be understood that, within the scope of the appended claims, the methods and systems presented herein may be practiced other than as specifically described.

What is claimed as new and desired to be secured by Letters Patent of the United States is:

The invention claimed is:

1. A surgical method, comprising:
   performing a medial oblique incision in a patient's knee, wherein the knee's vastus medialis obliques (VMO) muscle and quadriceps tendon remain intact and uncut;
   retracting the VMO muscle to expose the knee's distal femur;
   everting the knee's patella during the step of retracting by simultaneously applying a first force to an inferior pole of the knee's patella and a second force to a medial aspect of the VMO muscle;
   repairing the knee's distal femur during the step of retracting; and
   repairing the knee's patella during the steps of retracting and everting.

2. The surgical method of claim 1, wherein the step of retracting comprises:
   pulling, using at least one retractor, the VMO muscle towards a lateral side of the patient's knee.

3. The surgical method of claim 1, wherein the first force and the second force diverge at an acute angle.

4. The surgical method of claim 1, further comprising:
   drawing, on the patient's skin, a marking operable as a guide for the medial oblique incision.

5. The surgical method of claim 4, wherein the marking defines a path extending from a first point that is medial to the patient's tibial tuberclea to a second point that is between the patient's anterior and posterior aspect of the patient's medial thigh and just proximal to the patient's superior pole of the knee's patella.

6. A surgical method, comprising:
   incising a patient's knee along a path extending from a first point that is medial to the patient's tibial tuberclea to a second point that is between the patient's anterior and posterior aspect of the patient's medial thigh and just proximal to the patient's superior pole of the knee's patella, wherein the knee's vastus medialis obliques (VMO) muscle and quadriceps tendon remain intact and uncut;
   retracting the VMO muscle to expose the knee's distal femur;
   everting the knee's patella during the step of retracting by simultaneously applying a first force to an inferior pole of the knee's patella and a second force to a medial aspect of the VMO muscle;
   repairing the knee's distal femur during the step of retracting; and
   repairing the knee's patella during the steps of retracting and everting.

7. The surgical method of claim 6, further comprising:
   marking the patient's skin along the path prior to the step of incising.

8. The surgical method of claim 6, wherein the step of retracting comprises:
   pulling, using at least one retractor, the VMO muscle towards a lateral side of the patient's knee.

9. The surgical method of claim 6, wherein the first force and the second force diverge at an acute angle.

10. A surgical method, comprising:
    incising a patient's knee along a path extending from a first point that is medial to the patient's tibial tuberclea to a second point that is between the patient's anterior and posterior aspect of the patient's medial thigh and just proximal to the patient's superior pole of the knee's patella, wherein the knee's vastus medialis obliques (VMO) muscle and quadriceps tendon remain intact and uncut;
    retracting the VMO muscle to expose the knee's distal femur;
    repairing the knee's distal femur;
    everting the knee's patella by simultaneously applying a first force to an inferior pole of the knee's patella and a second force to a medial aspect of the VMO muscle; and
    repairing the knee's patella.

11. The surgical method of claim 10, further comprising:
    marking the patient's skin along the path prior to the step of incising.

12. The surgical method of claim 10, wherein the step of retracting comprises:
    pulling, using at least one retractor, the VMO muscle towards a lateral side of the patient's knee.

13. The surgical method of claim 10, wherein the first force and the second force diverge at an acute angle.

* * * * *